(12) United States Patent
Karunaratne et al.

(10) Patent No.: US 12,141,692 B2
(45) Date of Patent: Nov. 12, 2024

(54) MEMORY-AUGMENTED NEURAL NETWORK SYSTEM

(71) Applicant: International Business Machines Corporation, Armonk, NY (US)

(72) Inventors: Kumudu Geethan Karunaratne, Gattikon (CH); Manuel Le Gallo-Bourdeau, Zurich (CH); Giovanni Cherubini, Rueschlikon (CH); Abu Sebastian, Adliswil (CH); Abbas Rahimi, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 936 days.

(21) Appl. No.: 17/110,698

(22) Filed: Dec. 3, 2020

(65) Prior Publication Data

US 2022/0180167 A1    Jun. 9, 2022

(51) Int. Cl.
*G06N 3/08*    (2023.01)
*G06F 16/903*    (2019.01)

(52) U.S. Cl.
CPC ......... *G06N 3/08* (2013.01); *G06F 16/90335* (2019.01)

(58) Field of Classification Search
CPC ............ G06N 3/08; G06N 3/09; G06N 3/045; G06N 3/047; G06N 3/065; G06N 3/084; G06F 16/90335; G06F 16/906
See application file for complete search history.

(56) References Cited

U.S. PATENT DOCUMENTS

| | | | |
|---|---|---|---|
| 2016/0358071 A1 | 12/2016 | Grefenstette | |
| 2017/0228637 A1* | 8/2017 | Santoro | G06N 3/04 |
| 2017/0357879 A1* | 12/2017 | Odaibo | G06N 3/044 |
| 2018/0150755 A1* | 5/2018 | Bai | G06N 5/04 |
| 2019/0227739 A1 | 7/2019 | Khan | |
| 2019/0265955 A1* | 8/2019 | Wolf | G06F 11/36 |
| 2021/0020780 A1* | 1/2021 | Rozen | H01L 29/24 |

OTHER PUBLICATIONS

Shafiee et al., ISAAC: a convolutional neural network accelerator with in-situ analog arithmetic in crossbars, Jun. 18, 2016, ACM SIGARCH Computer Architecture News, vol. 44, Issue 3, pp. 14-26 (Year: 2016).*

Challapalle et al., "FARM: A Flexible Accelerator for Recurrent and Memory Augmented Neural Networks", Journal of Signal Processing Systems 92, pp. 1-15, <https://link.springer.com/article/10.1007/s11265-020-01555-w>.

(Continued)

*Primary Examiner* — Luis A Sitiriche
(74) *Attorney, Agent, or Firm* — Nicholas A. Welling

(57) ABSTRACT

The present disclosure relates to a method for classifying a query information element using the similarity between the query information element and a set of support information elements. A resulting set of similarity scores is transformed using a sharpening function such that the transformed scores are decreasing as negative similarity scores increase and the transformed scores are increasing as positive similarity scores increase. A class of the query information element is determined based on the transformed similarity scores.

9 Claims, 9 Drawing Sheets

(56) References Cited

OTHER PUBLICATIONS

Imani et al., "SearcHD: A Memory-Centric Hyperdimensional Computing with Stochastic Training", IEEE Transactions on Computer—Aided Design of Integrated Circuits & Systems, vol. 39, Issue 10, 2020, pp. 1-13, <http://acsweb.ucsd.edu/~sag076/papers/tcad19_searchd.pdf>.

Karunaratne et al., "In-memory Hyperdimensional Computing", Nature Electronics, vol. 3, Jun. 2020, pp. 1-13, <https://doi.org/10.1038/s41928-020-0410-3>.

Aguna et al., "Ferroelectric FET Based In-Memory Computing for Few-Shot Learning", GLSVLSI vol. 19, Proceedings of the 2019 on Great Lakes symposium on VLSI, May 2019, pp. 1-6, <https://dl.acm.org/doi/10.1145/3299874.3319450>.

Muthirayan et al, "Memory Augmented Neural Network Adaptive Controllers: Performance and Stability", arXiv:1905.02832v12 [cs.SY], May 4, 2020, 11 pp. 1-11, <https://arxiv.org/pdf/1905.02832.pdf>.

Ni et al., "Ferroelectric Ternary Content-addressable Memory for One-Shot Learning", Nature Electronics vol. 2, 2019, pp. 1-9, <https://www.nature.com/articles/s41928-019-0321-3>.

Ranjan et al., "X-MANN: A Crossbar based Architecture for Memory Augmented Neural Networks", DAC vol. 19, Proceedings of the 56th Annual Design Automation Conference Jun. 2019, Article No. 130, pp. 1-6, <https://dl.acm.org/doi/10.1145/3316781.3317935>.

Santoro et al., "One-shot Learning with Memory-Augmented Neural Networks", ARxIV:1605.06065V1 [cs.LG], May 19, 2016, pp. 1-13, <https://arxiv.org/pdf/1605.06065.pdf>.

Stevens et al., "Manna: An Accelerator for Memory-Augmented Neural Networks", MICRO '52: Proceedings of the 52nd Annual IEEE/ACM International Symposium on Microarchitecture, Oct. 2019, pp. 1-13, <https://doi.org/10.1145/3352460.3358304>.

Schmuck, et al., "Hardware Optimizations of Dense Binary Hyperdimensional Computing: Rematerialization of Hypervectors, Binarized Bundling, and Combinational Associative Memory", ACM Journal on Emerging Technologies in Computing Systems, vol. 15, Issue 4, Article No. 32,arXiv:1807.08583v2 [cs. ET] Apr. 3, 2019, 25 pgs.

Unknown et al., "Robust High-Dimensional Memory-Augmented Neural Networks", Jul. 16, 2020, 14 pages.

* cited by examiner

MEMORY-AUGMENTED NEURAL NETWORK SYSTEM

BACKGROUND

The invention relates in general to the field of neural network systems and, in particular, to a memory-augmented neural network system.

Neural networks are a computational model used in artificial intelligence systems. Neural networks are based on multiple artificial neurons. Each artificial neuron is connected with one or more other neurons, and links can enhance or inhibit the activation state of adjoining neurons.

SUMMARY

Various embodiments provide a neural network system, method and computer program product as described by the subject matter of the independent claims. Advantageous embodiments are described in the dependent claims. Embodiments of the present invention can be freely combined with each other if they are not mutually exclusive.

In one aspect, the invention relates to method for classification. The method comprises: (i) representing a set of support information elements (support set) in a vector space by a set of hypervectors respectively, wherein the vector space is provided such that hypervectors representing different classes of the information elements are dissimilar; (ii) representing at least one query information element by a respective hypervector in the vector space; (iii) determining a similarity score of the query information element with the set of support information elements using the hypervectors, resulting in a set of similarity scores associated with the set of support information elements respectively; (iv) transforming the set of similarity scores using a sharpening function such that the transformed scores are decreasing as negative similarity scores increase and the transformed scores are increasing as positive similarity scores increase; and (v) providing an estimation of a class of the query information element based on the transformed similarity scores.

In another aspect, the invention relates to a neural network system comprising: a controller including a processing unit configured to execute a neural network, and an interface connecting the controller to an explicit memory. The controller is configured for: (i) representing a set of support information elements in a vector space by a set of hypervectors, wherein the vector space is provided such that hypervectors representing different classes of the information elements are dissimilar; (ii) storing using the interface the set of hypervectors in the explicit memory; and (iii) representing a query information element by a hypervector in the vector space. The system is configured for: (i) determining a similarity score of the query information element with the set of support information elements using the hypervectors, resulting in a set of similarity scores associated with the set of support information elements respectively; (ii) transforming the set of similarity scores using a sharpening function such that the transformed scores are decreasing as negative similarity scores increase and the transformed scores are increasing as positive similarity scores increase; and (iii) providing an estimation of a class of the query information element based on the transformed similarity scores.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
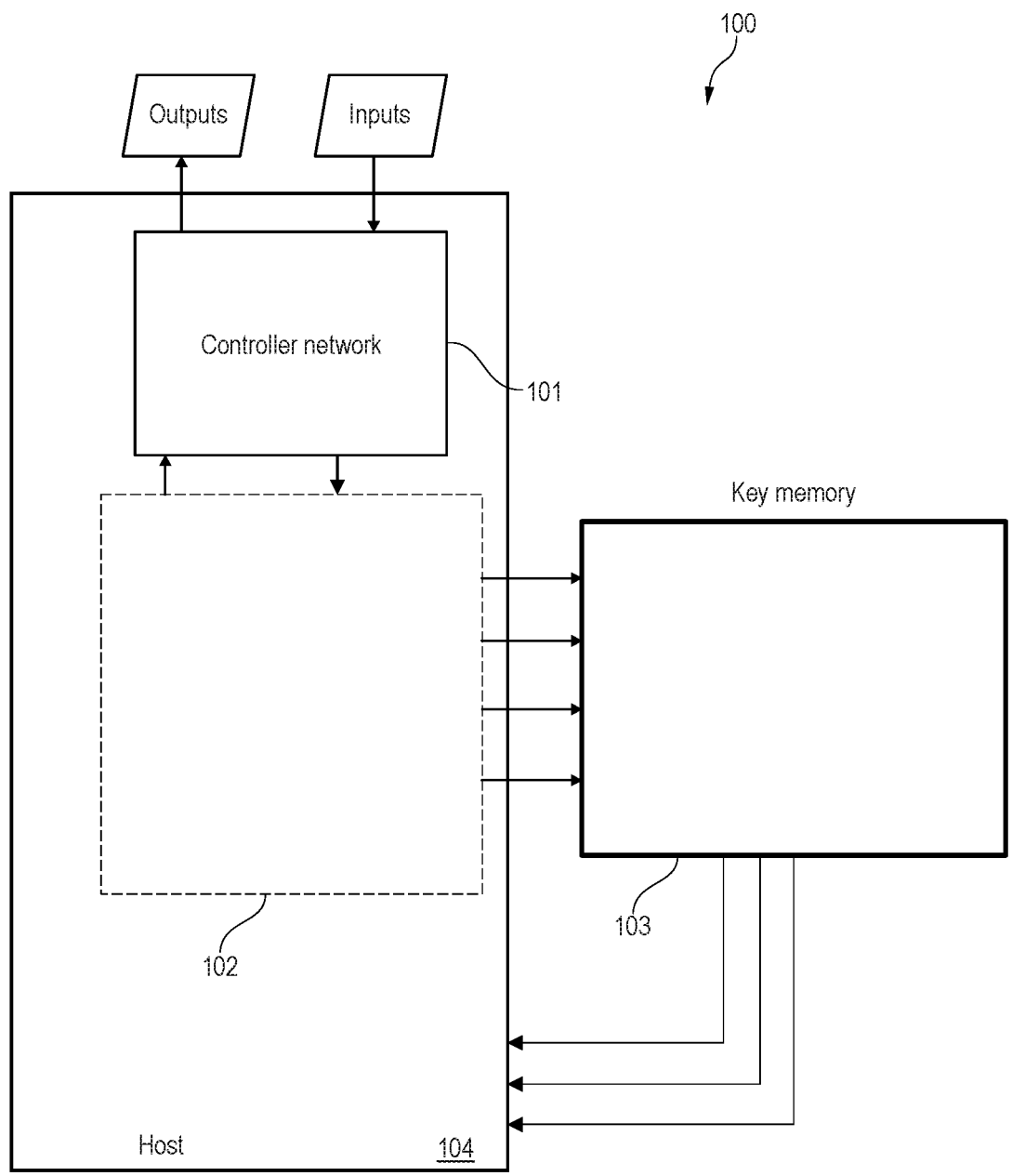
FIG. 1 is a block diagram schematically illustrating selected components of a memory augmented neural network system according to an example of the present subject matter.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Classification is a process related to categorization, the process in which ideas and objects are recognized and differentiated. Classification using traditional von-Neumann approaches, may however have limitations. In particular, the classification may involve memory intensive operations contributing to 80% of execution time, quickly forming a bottleneck when implemented in conventional von Neumann architectures (e.g., CPUs and GPUs), especially for tasks demanding thousands to millions of memory entries. The present subject matter may solve this issue by using a high-dimensional (HD) computing approach based on wide vectors named hypervectors or HD vectors. A hypervector is a vector having a dimension higher than a minimum dimension e.g. 2000. The hypervector may be a vector of bits, integers, real or complex numbers. Hypervectors may be advantageous as they may enable a large representational capacity and high robustness. With increasing number of dimensions, the probability of sampling similar vectors by chance may decrease rapidly. If the number of dimensions is high enough, randomly sampled vectors are expected to be almost orthogonal.

Another advantage of hypervectors may be that they can be used with a variety of devices. The present subject matter may provide a hardware friendly implementation of the image or text classification. For example, in-memory computing using resistive memory devices may be a promising non-von Neumann approach for making energy-efficient deep learning inference hardware. However, due to device variability and noise, the network may need to be trained in a specific way so that transferring the data to the analog resistive memory devices will not result in significant loss of accuracy. Using hypervectors may solve this issue as it makes it possible to adopt noisy, but extremely efficient devices for offloading similarity computations inside the key memory. For example, when unrelated items are represented by nearly orthogonal 10,000-bit hypervectors, more than a third of the bits of a hypervector can be flipped by randomness, device variations, and noise, and the faulty hypervector can still be identified with the correct one, as it is closer to the original error-free vector than to any unrelated vector chosen so far, with near certainty.

The classification may require the use of machine learning algorithms that learn how to assign a class label to examples from a problem domain. In particular, the classification may require a training phase during which the classification is optimized in order to reach an optimal classifier. Furthermore, the classification may be used in an inference phase where the resulting optimal classifier is used. However, the classification using hypervectors may be technically challenging either during the training phase or inference phase e.g. because the training may involve different optimization techniques, such as gradient based optimization, where each of them may require specific manipulations of the hypervectors. The present subject matter may solve this issue by an attention mechanism that computes a similarity score for each memory entry with respect to a given query, followed by a sharpening function.

The sharpening function may be advantageous for the following reasons. Training a classifier may require computation of the gradient of an error function, the error function may need to be differentiable. However, due to hardware limitations and constraints, guarantying the differentiability may not be a straightforward task. For that, an attention function may be used. The attention function may map a query hypervector and a set of key-value hypervector pairs to an output using the sharpening function. The output may be computed as a weighted sum of the values, where the weight assigned to each value is computed by a sharpening function and a similarity metric of the query with the corresponding key. The sharpening function may also advantageously be used to learn the directions of the hypervectors, thus preserving the correlation among input information elements. The sharpening function may be a correlation-preserving sharpening function. During inference, the same forward propagation flow used during training may need to be used for a reliable classification albeit without differentiability constraint. Thus, a simpler, non-differentiable sharpening function may advantageously also be used during the inference.

According to one embodiment, the information elements comprise images. The images of the present subject matter may correspond to hypervectors. The hypervectors associated with different image classes may be used to classify query hypervectors. In particular, the present subject matter may map samples from different classes, which should be dissimilar in the input space, to nearly orthogonal vectors in the vector space. The present subject matter may enable a few-shot learning to classify new data having seen only a few training examples.

According to one embodiment, the representation into hypervectors is performed by a machine learning model classifier, wherein the machine learning based classifier is provided in accordance with a memory augmented neural network (MANN) architecture, wherein an explicit memory is configured to store the set of hypervectors of the set of support information elements. The memory may, for example, comprise a crossbar array of nonvolatile memory devices.

The present subject matter provides a memory-augmented neural network system. The memory-augmented neural network system may enhance a neural network with an explicit memory (also referred to as key memory). This may combine advantages from neural network data processing and persistent storage. However, there is a need for improved hardware systems to execute such neural networks. Using the neural network may be advantageous as it may reduce the communication in the memory augmented system. For example, only binary values may be transmitted between the access heads and the controller network. For example, the memory contents may be represented with low precision since storage of binary values may be sufficient (e.g. no analog storage may be required). This may allow an area-efficient and flexible implementation of the memory. This may also allow to exploit novel storage technologies (e.g. phase-change memory cells).

The explicit memory may be a memory which may be accessed (for reading or writing) while executing the neural network. The execution of the neural network may comprise, for example, a training or inference of the neural network.

According to one embodiment, the hypervectors are provided as binary vectors or bipolar vectors. For non-binary hypervectors, bipolar and integer hypervectors are more commonly employed. Non-binary HD algorithms may achieve higher accuracy, while the binary counter-part may be more hardware-friendly and have higher efficiency. In case the step b) of representing the at least one query information element comprises the representation of multiple query information elements, steps c) to e) may be performed for each information element of the multiple query information elements e.g. steps c) to e) may be performed in parallel or concurrently for the multiple query information elements. Each query information element of the multiple query information elements may have (or belong to) a distinct class which is one of the classes of the support set.

According to one embodiment, the method further comprises: step f) of comparing the estimated class of the query information element with a true class of the query information element and step g) of determining an estimation error based on the comparison result. The comparing step f) and error estimation step g) may be performed by one step of evaluating a predefined loss function. Steps a) to g) may be repeatedly be performed for training the classifier, wherein the training is performed with backpropagation for optimizing the loss function.

In case the step b) of representing the at least one query information element comprises the representation of multiple query information elements, steps c) to g) may be performed for each of the multiple query information elements. This embodiment may enable training of the classifier according to a training or learning phase. The step a) of representing the set of support information elements may be part of a support set loading step of the learning phase. Steps b) to g) may be part of a query evaluation step of the learning phase and the backpropagation may be part of a backpropagation step of the learning phase. The support set loading step, query evaluation step and backpropagation step may form one training episode. That is, the training/learning phase may include one or more training episodes. The loss function may, for example, be a cross-entropy loss function. The loss function may be enhanced in accordance with the present subject matter. For example, in order to penalize a controller for generating output vectors with an occupancy ratio that deviates from the desired value, a regularizing term may be introduced into the loss function:

$$\mathcal{L}_{oc} = -\frac{1}{mn}\sum_{i=1}^{mn}\left(\frac{1}{d}\sum_{j=1}^{d}\left(\tanh(aK_i(j)) + \frac{1}{2}\right) - 0.5\right)^2,$$

$$\mathcal{L}_{aux} = \frac{-1}{mnd}\sum_{i=1}^{mn}\sum_{j=1}^{d}\tanh(aK_i(j) + \delta) - \tanh(aK_i(j) - \delta),$$

where $K_i$ is the support hypervector, d is the dimension of the hypervectors, a and $\delta$ parameters e.g. having values 100 and 0.0001 respectively, is the number of classes, and n is the number of information elements per class.

The first loss term $\mathcal{L}_{oc}$ is responsible for getting the norm of all support hypervector elements $K_i$ at 0.5d and the second auxiliary loss term is responsible for avoiding support hypervectors from reaching the null vector $0^d$.

For example, the learning phase may start by initializing the trainable parameters of the classifier. Randomness mayced be advantageous for the feature vectors to adopt certain important properties of high-dimensional computing. This may, for example, enable that the number of positive and negative components of the feature hypervectors are approximately equal. After initializing the parameters, the support set loading step may be performed. For that, a support set may be randomly selected from a training dataset, which is then mapped to the feature space (or vector space) via the classifier and stored in the key memory. More specifically, this support set loading step generates support hypervectors from the forward pass through the classifier, and writes them in the key memory. Each class in the support set gets assigned a unique one-hot label. For each support hypervector in the key memory, the corresponding one-hot support label is stored in the value memory. After this support set loading step, both key and value memories have been written and may remain fixed until the next training episode is presented. In the query evaluation step, during one episode of the learning phase, a whole batch of g query samples (i.e. the at least one query information element of step b) comprises g query information elements) may be processed together in order to produce a single loss value. There is a maximum size for the query batch which may be dependent on the number of available samples per class in the training dataset. As the query samples stem from the same classes as the samples in the support set, problems with a higher number of shots leave fewer samples for the query batch. Then, the query batch is mapped to the feature space in the same way as the support set. This yields a batch of probability distributions over the potential labels. The backpropagation step may be supervised, that is, the labels of the query batch may need to be available. From the ground truth one-hot labels Y of the query information elements and the output of the previous query evaluation step P, the logarithmic loss $\lambda i$ is computed for every query information element $i \in \{1 \ldots, g\}$ as follows: $\lambda_i = -\Sigma_{j=1}^{m}(Y_{i,j}\log(P_{i,j}) + (1-Y_{i,j})\log(1-P_{i,j}))$, where the average loss may be defined as:

$$\text{loss} = \frac{1}{m}\sum_{i=1}^{g}\lambda_i, \text{ where } Y \in \mathbb{R}^{g \times m}, P \in \mathbb{R}^{g \times m}, \lambda \in \mathbb{R}^{g}.$$

The three steps, namely the support set loading step, the query evaluation step and the backpropagation step may repeatedly be performed so that the classifier may provide meaningful predictions. Each episode is administered on a different (random) subset of the training classes e.g. each episode may use a support set having classes different from the classes of support sets of each previous episode. This may prevent the classifier from overfitting. In the process, the parameters of the classifier are updated such that the objective function is minimized. This procedure is called maturing the classifier. The learning phase may, thus, result in a trained classifier (also referred to as mature classifier). In one example, the mature classifier may be associated with the best loss function value. In another example, it may be determined whether the classifier is mature using a validation set. During the training phase, the classifier's performance may be frequently evaluated on the validation set without computing the loss and updating the classifier's parameters. The performance can be measured with an accuracy metric computed per few-shot problem and states the fraction of correctly classified queries in a batch of size g as follows:

$$\text{accuracy} = \frac{1}{g}\sum_{i=1}^{g}\left[1 \text{ if } \underset{j\in\{1,\ldots,m\}}{\text{argmax}} P_{i,j} = l_i \text{ else } 0\right].$$

A moderate number of queries g may be presented per problem and a rather large number of problems drawn from the validation set in order to average out fluctuations in the problem difficulty during evaluation. The state of the classifier yielding the best performance represents the mature classifier.

The mature classifier may be used in the inference phase. The inference phase may have two steps similar to the learning phase: the support set loading step, and the query evaluation step. The first step generates support hypervectors from the forward pass through the mature classifier, and writes them into the key memory followed by their labels into the value memory. This essentially may lead to learning prototype vectors for the classes that are never exposed in the learning phase. By the end of this loading step, the key and value memories may be programmed for the few-shot classification problem. Then the query evaluation step similarly generates query hypervectors at the output of the classifier that may be compared to the stored support hypervectors generating prediction labels.

FIG. 1 is a diagram of a neural network system 100 in accordance with an example of the present subject matter.

The neural network system 100 comprises a host system 104 and a memory 103. The host system 104 comprises a controller 101 and an interface 102. In one example, the host system 104 may be implemented in software. The interface 102 connects the controller 101 to the memory 103. The controller 101 comprises a processing unit, which is configured to execute a neural network; the controller 101 can thus be regarded as a controller network. The neural network is provided for exemplification purpose only and it is not limited to; other learning algorithms that enable to represent input data into a hypervector may be used as well. The neural network may, for example, be a CNN. The execution of the neural network may comprise, for example, training or inference of the neural network. The execution of the neural network based on an input image may result in a hypervector that represents the input image. The controller 101 may be configured to write using the interface 102 the hypervector in the memory 103. For that, the controller 101 may generate write instructions for writing a hypervector to the memory 103. The interface 102 may be configured for coupling write signals, representing the elements of the hypervector, into input lines of the memory 103, thereby writing data into the memory 103. The interface 102 may typically include multiple wordline drivers connecting the controller network 101 to the memory 103. The wordline drivers may be connected to input lines of the memory 103. The data stored in the memory 103 may, for example, be read and used by the host system 104 in order to compute similarities with a query hypervector.

Note, the processing unit of the controller 101 may for instance be a general-purpose processing unit (e.g., a central processing unit of a standard computer), or comprise analog circuits. It may notably include a neuromorphic device (not shown). However, here, the memory 103 does not form part of the processing unit. Rather, the memory 103 is configured to serve as an explicit memory for the controller 101 and its processing unit. Thus, the memory 103 used as explicit memory should not be confused with other memories that may possibly form part of the controller 101. The neural network system 100 may thus be regarded as a memory-augmented neural network (MANN) system.

Figure 2A:
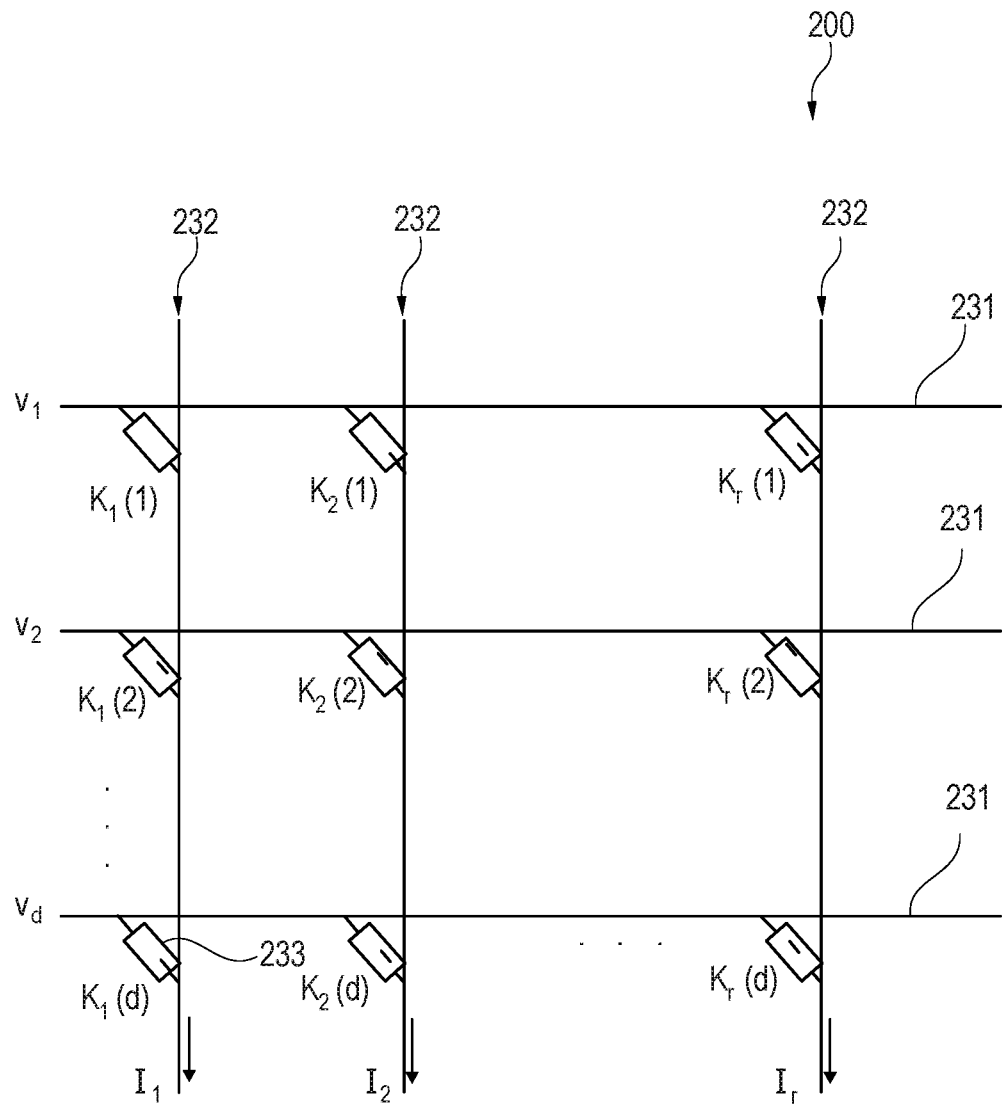
FIG. 2A depicts a diagram of a memory array for binary representation in accordance with an example of the present subject matter.

FIG. 2A depicts an example of the memory 103 of FIG. 1. FIG. 2A depicts a crossbar array structure 200 of memristors that provide local data storage. For example, the memory 103 comprises a neuromorphic memory device which has said crossbar array structure 200. The crossbar array structure 200 includes input lines 231 and output lines 232, where the lines 231, 232 are interconnected at junctions via electronic devices 233 (e.g., memristive devices). The electronic devices 233 are programmed so as to incrementally change states of the devices 233. This is achieved by coupling write signals into one or more of the input lines 231 of the crossbar array structure 200. The write signals are generated based on support set hypervectors that are generated by the controller 101. When needed, data can be retrieved from the crossbar array structure 200 according to a multiply-accumulate operation. This is achieved by coupling read signals to input lines 231.

Each electronic device 233 of the neuromorphic device may possibly include one or more memristive devices. Also, dual output lines (columns) may be involved as described with reference to FIG. 2B, one to store positive values, and another to store negative values, as usual in the art. Several types of memristive devices may be contemplated, such as PCM cells, resistive random-access memory (RRAM), static random-access memory (SRAM) cells, or electro-chemical random-access memory (ECRAM) cells. In other variants, flash cells may be used.

Programming the electronic devices 233 results in incrementally change states of the devices 233 (e.g., change the electrical conductances of the devices 233). The states of the electronic devices 233 correspond to certain values, which determine data as stored on the memory 103. Reading from memory 103 of FIG. 2A is achieved via a vector-matrix multiplication, which can be performed in constant time, meaning that data may possibly be retrieved during any operation cycle. In practice, however, read operations may only be performed at specific times (according to the general algorithm run at the controller) and not necessarily at each operation cycle. In all cases, data can be retrieved via a multiply-accumulate operation, which is parameterized by values corresponding to the states of the electronic devices 233. This way, data can be stored on the memory 103 and such data can be recalled by the controller 101, as needed to perform tasks supervised by the controller 101.

The crossbar array structure 200 may, for example, comprise d input lines 231 and r output lines 232, where d>1 corresponds to the dimension of the hypervectors and r>1 may be the number of information elements in a support set. In this case, the memory capacity of the memory 103 is determined by a memory matrix K of dimension d×r. Each column of the matrix K may store the components of one hypervector that represents one information element.

The crossbar array structure 200 may enable a binary representation for the memory 103. Inputs to the crossbar array structure 200 can for instance be provided as binary vectors. The following linear equation enables to obtain the binary vectors by transforming their corresponding bipolar vectors (e.g. as defined in FIG. 2B) into binary vectors using the following equation $\hat{x}=\frac{1}{2}(\mathring{x}+1)$, where denotes the binary vector and $\mathring{x}$ denotes the bipolar vector. Unlike the bipolar vectors, the binary vectors may not necessarily maintain a constant norm which may affect the simplicity of the cosine similarity metric. To overcome this, the HD property of pseudo-randomness can be used. Specifically, by initializing the controller's weights randomly, and expanding the vector dimensionality, the hypervectors at the output of the controller may exhibit the HD computing property of pseudo-randomness. In case the bipolar vector $\mathring{x}$ has a near equal number of −1 and +1 components, after transformation with the equation $\hat{x}=\frac{1}{2}(\mathring{x}+1)$ this also holds for the binary vector $\hat{x}$ in terms of the number of 0- and 1-components, leading to $$\|\hat{x}\| \approx \sqrt{\frac{d}{2}}.$$

Hence the transformation given by the equation $\hat{x}=\frac{1}{2}(\mathring{x}+1)$, approximately preserves the cosine similarity as demonstrated with the following equations:

$$\alpha(\mathring{a}, \mathring{b}) \approx \frac{2}{d}\mathring{a}\cdot\mathring{b}^T = \frac{1}{2d}(\mathring{a}+1)\cdot\left(\mathring{b}+1\right)^T =$$

$$\frac{1}{2d}\left(\mathring{a}\cdot\mathring{b}^T + \underbrace{\sum_i \mathring{a}_i + \sum_i \mathring{b}_i + d}_{\approx 0}\right) \approx \frac{1}{2}\left(\frac{1}{d}\mathring{a}\cdot\mathring{b}^T + 1\right) = \frac{1}{2}\left(\alpha\left(\hat{a}, \hat{b}\right) + 1\right)$$

where the approximation between the third and fourth line is attributed to the equal number of −1 and +1-components. The transformed vectors at the output of the controller may exhibit 2.08% deviation from the fixed norm of $$\sqrt{\frac{d}{2}}, \text{ for } d = 512.$$

Because this deviation is not significant, the transformed binary vectors may advantageously be used in the inference experiments. This deviation can be further reduced to 0.91% by training the controller to closely learn the equiprobable binary representations, using a regularization method that drives the binary hypervectors towards a fixed norm.

Hence, the memory 103 may be configured to store the dense binary representations of support vectors, and compute the dot products as the similarities thanks to the binary vectors with the approximately fixed norm.

Figure 2B:
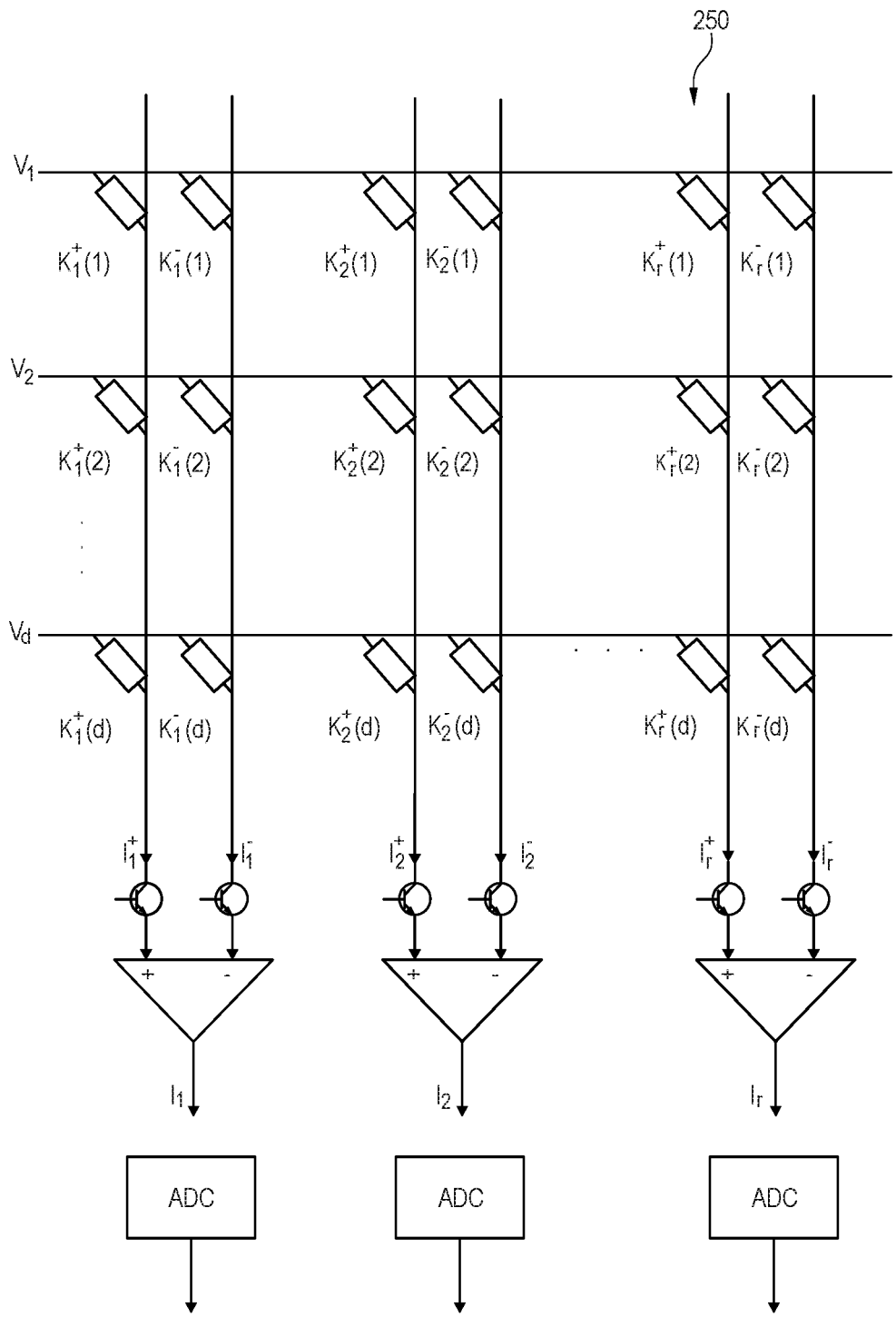
FIG. 2B depicts a diagram of a memory array for bipolar representation in accordance with an example of the present subject matter.

FIG. 2B depicts a diagram of an alternative implementation of the memory 103 using a crossbar array structure. FIG. 2B depicts a crossbar array structure 250 in accordance with an example of the present subject matter. The crossbar array structure 250 may be a crossbar array of memristor devices. In analogy with the structure of FIG. 2A, a set of d distinct parallel lines arranged horizontally (d rows) may be associated with a set of distinct parallel lines arranged perpendicular (r columns) to d lines such that a memristor device is present at all d×2r intersections of these lines. The crossbar array structure 250 may, for example, form a crossbar of PCM devices. Current through a single memristor device is a product of the voltage applied across it and its conductance value. Since conductance is always positive, a single column consists of two vertical lines together representing signed values in the array and their currents are subtracted to get the net current of that column as given by the following equation $I_j = I_j^+ - I_j^-$, where $I_j^+ = \Sigma_{i=1:d} K_j^+(i) \times v_i$ and $I_j^- = \Sigma_{i=1:d} K_j^-(i) \times v_i$. $K^+$ may encode a positive part of a weight, and $K^-$ may encode a negative part of a weight. For example, $K^+ = K$ and $K^+ = 0$ if the matrix K is positive, and $K^+ = 0$ and $K^- = |K|$ if K is negative.

Matrix-vector multiplication may be computed by applying voltages along the rows of the crossbar and summing up currents (using Kirchhoff's current law) along the columns in the crossbar. Net output current is usually measured using analog to digital converter (ADC) for further computations. An ADC can convert an analog value to its digital representation provided input analog value is always bounded, otherwise ADC output saturates. In another example, a single or fewer ADCs may be used per crossbar array to sample column currents. The output of any group may, for example, be bounded to an interval [−4,4]. This may facilitate use of a single or fewer ADCs that can be multiplexed across all columns.

The output of the controller may be a d-dimensional real hypervector. During the training phase the real-valued hypervectors may directly be written to the memory 103. However, during the inference phase, the support hypervector components generated by the controller may be quantized by applying an activation function. This function is the sign function for bipolar representations. The key memory then stores the bipolar components. Afterwards, the query vectors that are generated by the controller also undergo the same component transformation, to generate a bipolar query vector during the inference phase. The reliability of this transformation may derive from the fact that quantization approximately preserves the direction of hypervectors. The main benefit of the bipolar representation may be that every two-state component is mapped on two binary devices. Further, bipolar hypervectors with the same dimensionality may always have the same norm: $\hat{x} = \sqrt{d}, \hat{x} \in \{-1, +1\}^d$, where $\hat{x}$ denotes a bipolar vector. This renders the cosine similarity between two vectors as a simple, constant-scaled dot product, and turns the comparison between a query and all support vectors to a single matrix-vector operation:

$$\alpha(\hat{a}, \hat{b}) = \frac{1}{d} \hat{a} \cdot \hat{b}^T$$

$$w = \frac{1}{d} \hat{q} \cdot \hat{K}^T$$

As a result, the normalization in the cosine similarity (i.e., the product of norms in the denominator) can be removed during inference. The requirement to normalize the attention vectors is also removed.

Figure 3:
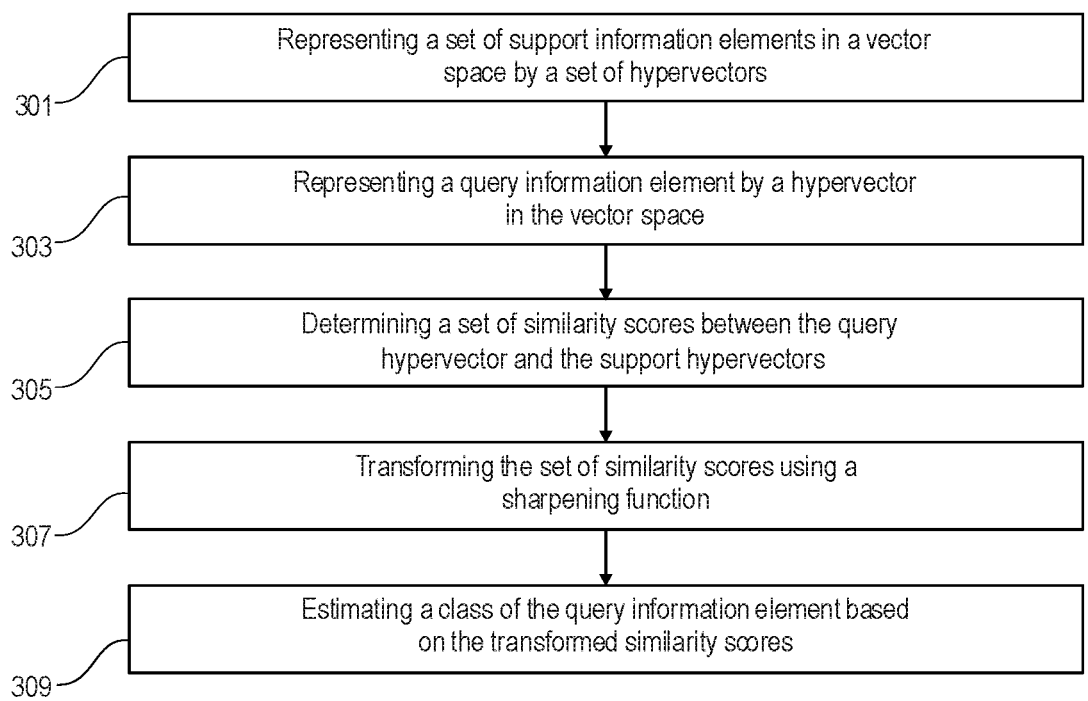
FIG. 3 is a flowchart of a classification method in accordance with an example of the present subject matter.

FIG. 3 is a flowchart of a classification method in accordance with an example of the present subject matter. For the purpose of explanation, the method described in FIG. 3 may be implemented in the system illustrated in FIG. 1, but is not limited to this implementation.

The method may advantageously be used depending on the context in which the classification is required. For example, as mentioned herein the classification may be a task that requires the use of machine learning algorithms that learn how to assign a class label to examples. The machine learning algorithm may be used in the context of training and inference. During the training, a cost function may use the result of the classification in order to assess classification performance on the query information element given the respective support set. At test time, the result of the classification may be used as an indication of a class of the input information element.

A set of support information elements (which may be named "support set") may be represented in step 301 in a vector space by a set of hypervectors respectively. The vector space is provided such that hypervectors representing different classes of the information elements are dissimilar. The information element may, for example, be an image, a text or an utterance that can be classified into a category. The support set may represent a set of m classes, wherein each class is represented by n information elements, where n>1. For example, in case of a few-shot scenario, the support set may include m classes with n information elements per class, wherein n is much smaller than m.

For example, the hypervectors of the set of support information elements may be referred to as: $K_1, K_2, \ldots K_{n \times m}$, which correspond to the columns of the matrix K respectively. The set of hypervectors may, for example, be stored in the memory 103. Following the example of FIG. 2A, the crossbar array may comprise columns storing binary values of the set of hypervectors $K_1, K_2, \ldots K_{n \times m}$ respectively.

Step 301 may, for example, be performed by the controller 101. The controller 101 may have trainable parameters. In one example, the controller 101 may be a trained or mature controller, that is, the trainable parameters may have optimal values. In another example, the controller is being trained, that is, the values of the trainable parameters may be initialized in step 301 or may be set to values based on a gradient based optimization approach. The controller 101 may be a classifier. In case the controller is a deep neural network, the output layer of the deep neural network may have a number of nodes that corresponds to the dimension d of the hypervectors. For example, the controller may receive as input an information element so that each node of the output layer may output a respective value of the hypervector that represents said information element. If, for example, the information element is an image, the pixel values of the image may be provided as input to the controller 101 in order to provide a hypervector representing the image.

At least one query information element may be represented in step 303 by a query hypervector q in the vector space. The query information element may have one class of the set of classes of the support set. The query hypervector q has the same dimension d as each hypervector of the set $K_1, K_2, \ldots K_{n \times m}$ and may be generated by the controller 101 as described with reference to step 301.

Figure 4:
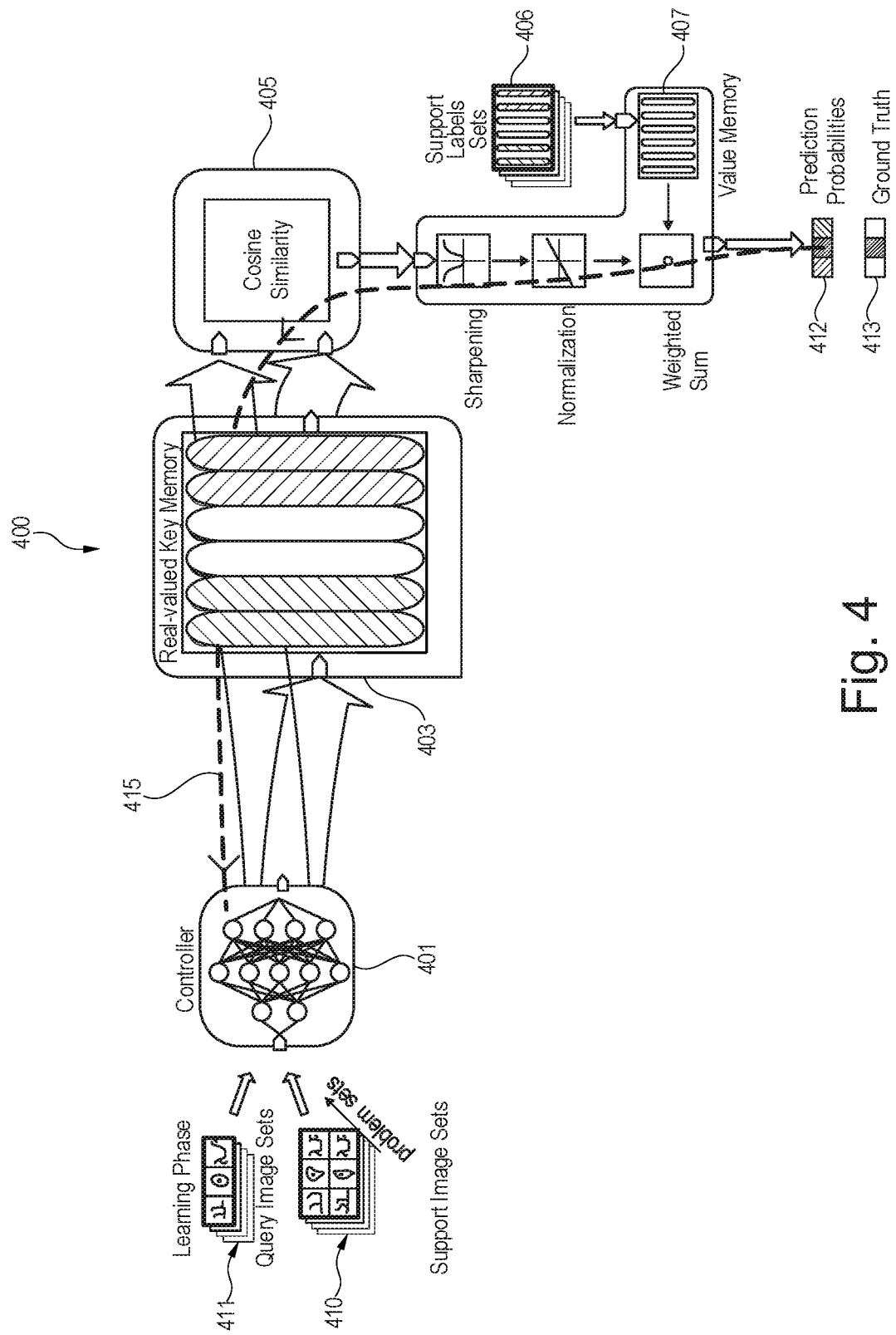
FIG. 4 depicts a memory augmented neural network architecture in accordance with an example of the present subject matter.
Figure 5A:
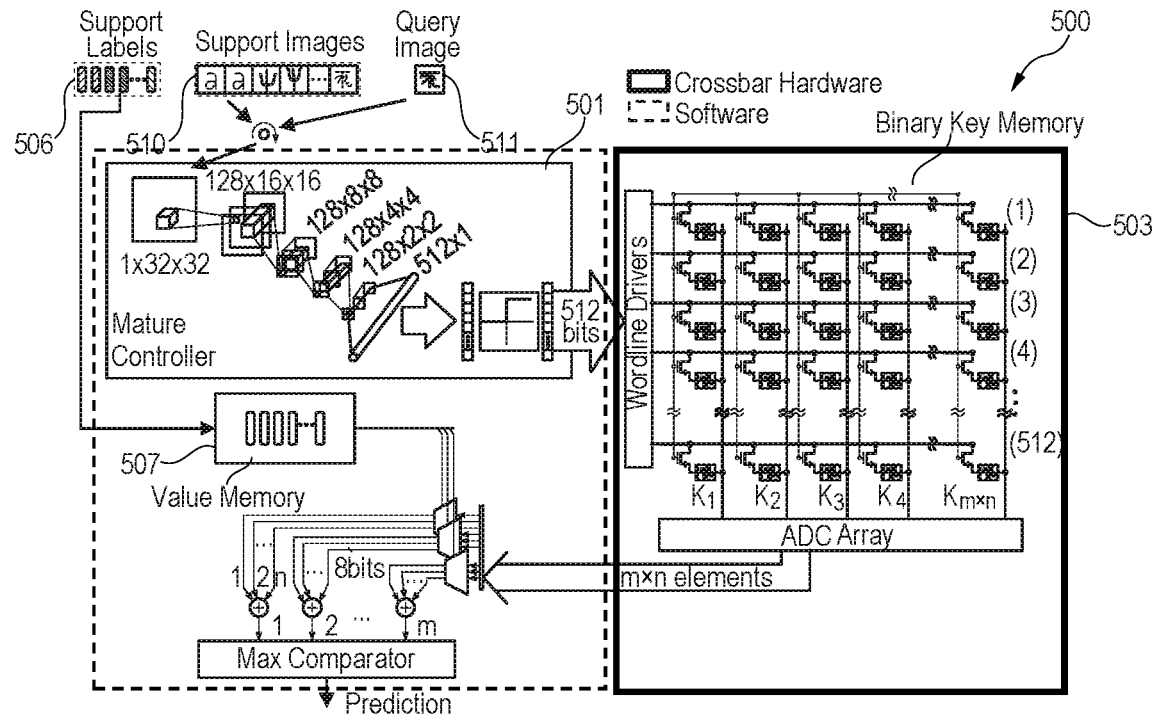
FIG. 5A depicts a memory augmented neural network architecture in accordance with an example of the present subject matter.
Figure 5B:
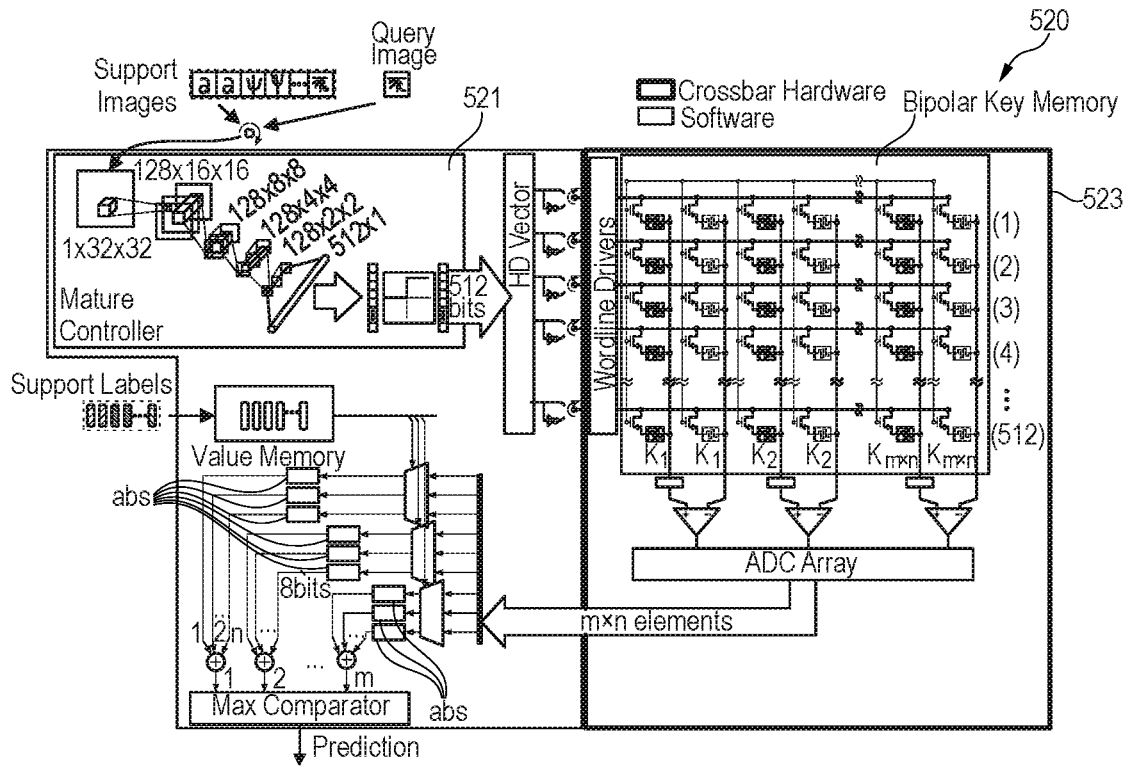
FIG. 5B depicts a memory augmented neural network architecture in accordance with an example of the present subject matter.

A similarity score of the query information element with the support set may be determined in step 305 using the respective hypervectors. That is, the similarity between the query hypervector q and each of the support set of hypervectors $K_1, K_2, \ldots K_{n \times m}$ may be computed. The similarity score may be determined using, for example, a cosine similarity metric or a dot product. This may result in a set of similarity scores associated with the support set respectively e.g. scores $S_1, S_2, \ldots S_{n \times m}$. The cosine similarity may have a domain and range of $\alpha$: $\mathbb{R}^d \times \mathbb{R}^d \rightarrow [-1,1]$, where $\alpha(x, y)=1$ means x and are perfectly similar or correlated, $\alpha(x,y)=0$ means they are perfectly orthogonal or uncorrelated, and $\alpha(x,y)=-1$ means they are perfectly anticorrelated. Therefore, the similarity scores may have values 0, 1 or -1. $\alpha$ is a similarity metric e.g. cosine similarity. FIG. 4 shows an example implementation for computing the cosine similarity scores. FIGS. 5A and 5B show an example implementation for computing the similarity scores using dot products.

The set of similarity scores may be transformed in step 307 using a sharpening function $\varepsilon$. From the point of view of attention, two nearly dissimilar (i.e., uncorrelated) hypervectors should lead to a focus close to 0. Therefore, the sharpening function E may satisfy the following condition: $\varepsilon(\alpha(x,y)) \approx 0$ when $\alpha(x,y) \approx 0$. (Eq1). The equation Eq1 may ensure that there is no focus between a query hypervector and a dissimilar support hypervector. The sharpening function E may also satisfy the following inequalities:

$$\varepsilon(\alpha) \geq 0 \quad (Eq2)$$

$$\varepsilon(\alpha_1) \leq \varepsilon(\alpha_2) \text{ when } \alpha_1 < \alpha_2 \text{ and } \alpha_1, \alpha_2 > 0 \quad (Eq3)$$

$$\varepsilon(\alpha_1) \geq \varepsilon(\alpha_2) \text{ when } \alpha_1 < \alpha_2 \text{ and } \alpha_1, \alpha_2 < 0 \quad (Eq4)$$

Equation Eq2 implies non-negative weights in the attention vectors, whereas Equations Eq3 and Eq4 imply a strictly monotonically decreasing function on the negative axis and a strictly monotonically increasing function on the positive axis. Thus, the transformation of step 307 may be performed such that the transformed scores are decreasing as negative similarity scores increase and the transformed scores are increasing as positive similarity scores increase. The attention function may thus be defined as follows.

$$\sigma(q, K_i) = \frac{\varepsilon(\alpha(q, K_i))}{\sum_{j=1}^{mn} \varepsilon(\alpha(q, K_j))}, \quad \alpha(q, K_i) = \frac{q \cdot K_i^T}{\|q\| \|K_i\|}$$

where q is a query hypervector, K, is a support hypervector in the key memory 103, m is the number of ways (i.e., classes), and n is the number of shots. The attention function performs the (cosine) similarity comparison across the support vectors in the key memory 103, followed by sharpening and normalization to compute its output as an attention vector $w = \sigma(q, K)$.

Figure 6:
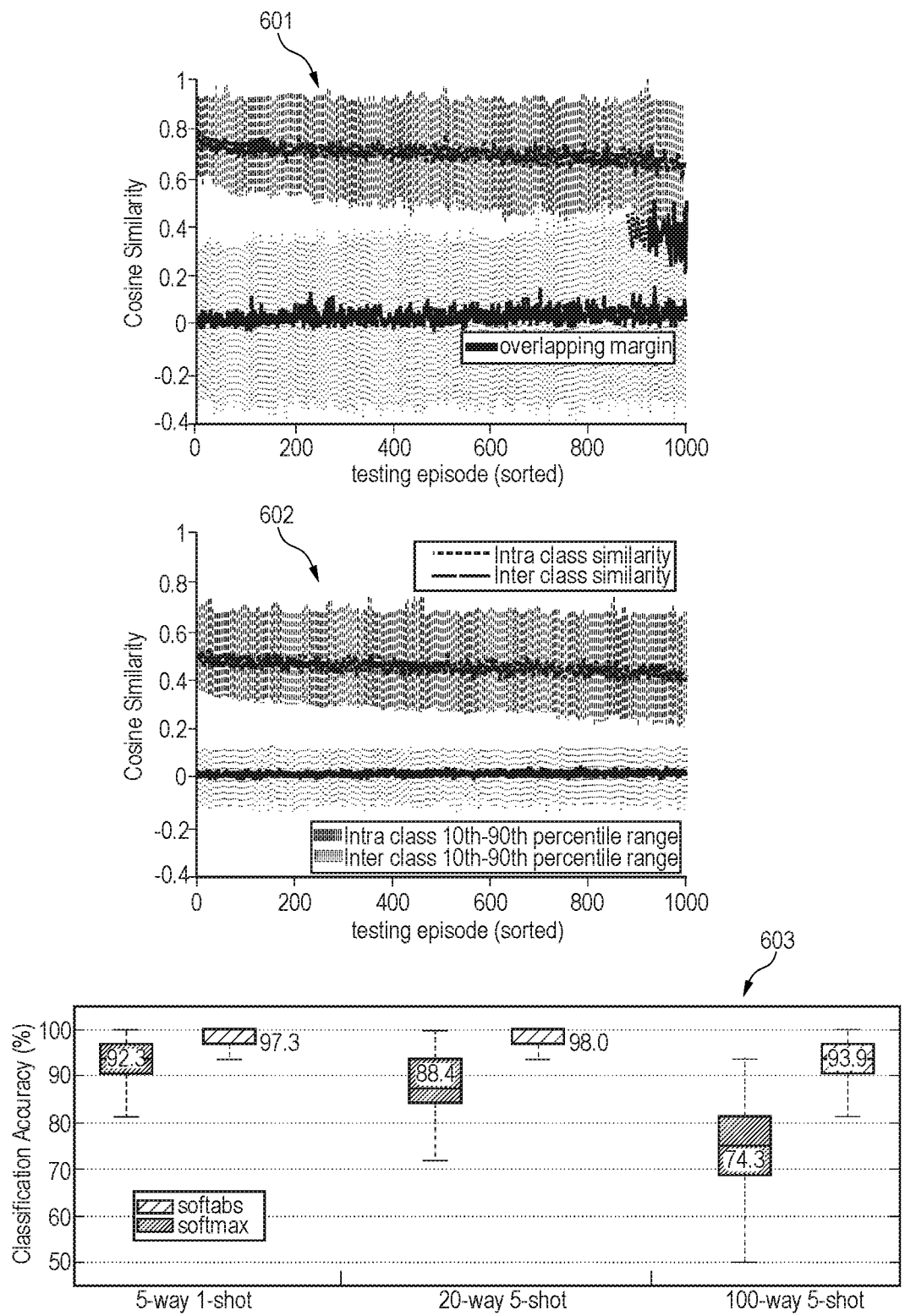
FIG. 6 is a plot showing the classification accuracy results and a distribution of inter class and intra class similarities across testing episodes, using different sharpening functions.

Among a class of sharpening functions that can meet the above-mentioned conditions, the following soft absolute (softabs) function may be used:

$$\varepsilon(\alpha) = \frac{1}{1 + e^{-(\beta(\alpha - 0.5))}} + \frac{1}{1 + e^{-(\beta(-\alpha - 0.5))}}$$

where $\beta=10$, as a stiffness parameter, which leads to $\varepsilon(0) = 0.0134$. The softabs sharpening function may lead to uncorrelated hypervectors for different classes, as they would have been randomly drawn from the HD space to robustly represent unrelated items. As shown in FIG. 6, the learned representations by softabs bring the support vectors of the same class close together in the HD space, while pushing the support vectors of different classes apart. This hypervector assignment provides higher accuracy, and retains robustness even when the real hypervectors are transformed to bipolar. Compared to the softmax, the softabs sharpening function may effectively improve the separation margin between inter-class and intra-class similarity distributions (cf. FIG. 6), and therefore achieve up to 5.0%, 9.6%, 19.6% higher accuracy in 5-way 1-shot, 20-way 5-shot, and 100-way 5-shot problems, respectively. By using this sharpening function, the architecture may not only make the end-to-end training with backpropagation possible, but also learn the hypervectors with the proper direction.

A class of the query information element may be estimated in step 309 based on the transformed similarity scores. For example, by comparing the scores, the estimated class may be the class of the information element of the support set that is associated with the best (e.g. highest) similarity score. Each information element of the support set may be associated with a label indicative of the class of the information element. The labels may be stored in a value memory. Thus, in another example, the class of the query information element may be determined by accumulation of similarity scores belonging to the same support label in the value memory and finding the class with maximum accumulated score $$l_{predicted} = \underset{i \in \{1, \ldots, m\}}{\arg\max} p_i,$$

where $p = w \cdot V$ is the output probability distribution which is the weighted sum of one-hot labels (i.e., the probabilities of individual shots within a class are summed together). This ranking may be called sum-argmax and may result in higher accuracy, e.g. in the PCM inference experiments, compared to a global-argmax where there is no summation for the individual probabilities per class. $V \in \mathbb{R}^{mn \times m}$ is the value memory.

In case of the training, steps 301 to 309 may enable to measure the performance of the classifier for the given support set of step 301 and the query of step 303. For example, the result of the classification may be used to quantify the error between estimated class and expected class. The error may be used to decide whether to further train the classifier or used as it is.

FIG. 4 depicts a memory augmented neural network architecture in accordance with an example of the present subject matter.

In the MANN architecture 400, the key memory 403 remains mostly independent of the task and input type, while the controller 401 may be fitted to the task and especially the input type. The MANN architecture 400 enables, for example, the training of the controller 401 to classify images, in particular, few-shot image classification using the Omniglot dataset. The Omniglot dataset contains over 1600 classes but only a few samples per class. For this few-shot classification, a convolutional neural network (CNN) is used as controller 401. This may be advantageous as the CNNs may be excellent controllers that provide an embedding function to map the input image to an internal feature representation. A few-shot classification problem is determined by the number m of ways (i.e., classes to distinguish), and n shots (i.e., samples per class to learn from). For that, the support set may be defined as the collection of samples from different classes that the model learns from. The query batch is a collection of samples drawn from the same set of classes as the support set. The key memory 403 creates at least as many entries as the product (r=m×n) of the number of ways by the number of shots. These entries are not accessed by stating a discrete address, but by comparing a query from the controller's side with all entries.

Multiple problems may be defined in order to train the controller 401. Each problem includes classes with n examples of each. These are named support set for the problem and are used for learning how to solve this problem. In addition, there are further examples of the same classes, known as a query set, which are used to evaluating the performance on this problem. This is shown in FIG. 4, where multiple problems are defined by respective pairs of support set 410 and query set 411. In the example of FIG. 4, the number of classes is m–3 and the number of shots is n–2. Each query set may comprise at least one image per class of the m classes.

In the MANN architecture 400, a methodology is illustrated for training the CNN controller to encode complex image inputs to hypervectors conforming with the HD computing properties. These properties assign dissimilar images to uncorrelated hypervectors that can be stored, or compared with hypervectors already stored in the key memory with extreme robustness. The MANN architecture 400 keeps the interface between the controller 401 and key memory 403 differentiable by using a sharpening function, and therefore optimizable by gradient descent methods. The learning phase uses an episodic training procedure for the CNN by solving various few-shot problem sets that may gradually enhance the quality of the mapping by exploiting classification errors. Those errors are represented as a loss, and are propagated all the way back to the controller 401, whose parameters are then updated to counter this loss and to reach maturity. Different loss functions can be considered to closely tune the desired distribution of hypervectors. The loss function may, for example, be a cross-entropy loss function as known in the art. The loss function may be enhanced in accordance with the present subject matter as follows. The similarity computation during inference is approximated as a dot product between support vector embeddings and query vector embedding. The deviation caused by this approximation may be minimized by introducing a regularizer that constrains the controller to learn embedding that are of a fixed norm or a fixed occupancy ratio. This is achieved by adding the following regularizing terms into the loss function:

$$\mathcal{L}_{oc} = -\frac{1}{mn}\sum\nolimits_{i=1}^{mn}\left(\frac{1}{d}\sum\nolimits_{j=1}^{d}\left(\tanh(aK_i(j))+\frac{1}{2}\right)-0.5\right)^2, \text{ and}$$

$$\mathcal{L}_{aux} = \frac{-1}{mnd}\sum\nolimits_{i=1}^{mn}\sum\nolimits_{j=1}^{d}\tanh(aK_i(j)+\delta)-\tanh(aK_i(j)-\delta).$$

The first loss term $\mathcal{L}_{oc}$ is responsible for getting the norm of all support vector elements $K_i$ at 0.5d and the second auxiliary loss term is responsible for avoiding support vectors from reaching the null vector $0^d$.

In this supervised step, the controller is updated by learning from its own mistakes (also referred to as meta-learning). The controller finally learns to discern different image classes, mapping them far away from each other in the HD feature space.

Specifically, the learning phase involves the controller 401 which first propagates images in the support set 410 to generate the support hypervector representations that are stored in the key memory 403. The corresponding support labels 406 are stored in the value memory 407. The support labels may be stored in the same order in which the corresponding support hypervectors are stored in the key memory 403. The support label may be a one-hot vector of size m indicative of a class of a respective hypervector of the support set. For the evaluation, the controller 401 propagates the query image(s) 411 to produce the hypervectors for the query. A cosine similarity module 405 then compares the query hypervector with each of the support hypervectors stored in the key memory 403. Subsequently, the resulting similarity scores are subject to a sharpening function, normalization, and weighted sum operations to produce prediction probabilities with the value memory 407. The prediction probabilities 412 are compared against the ground truth labels 413 to generate an error which is backpropagated through the network to update the weights of the controller as indicated by the arrow 415. This episodic training process is repeated across batches of support and query images from different problem sets until the controller reaches maturity e.g. until the optimal loss value is reached.

FIG. 5A depicts a memory augmented neural network architecture in accordance with an example of the present subject matter.

FIG. 5A depicts a MANN architecture 500 with the binary key memory 503 enabling analog in-memory computations and a mature controller 501. The architecture of the MANN 500 is simplified (compared to the MANN 400 of FIG. 4) for the inference phase by applying transformations and approximations to derive a hardware-friendly version. These transformations enable the key memory 503 to readily use equiprobable binary or bipolar representations with memristive devices, and the approximations further simplify the inference operations. The memristive devices are assembled in a crossbar array, and the similarity search is efficiently computed as dot product by exploiting Kirchhoff's circuit laws in O(1) time complexity. This combination of binary/bipolar computational memory and the mature controller 501 efficiently handles few-shot learning and classification of incoming unseen examples on the fly without the need for fine tuning the controller weights.

The controller 501 may be a trained CNN that results from the training of FIG. 4. The CNN may be configured to receive as input grayscale 32 by 32 pixel images, randomly augmented by shifting and rotating them before being mapped. The embedding function $f$ enabled by the controller 501 may thus be a non-linear mapping as follows: $f: \mathbb{R}^{32\times 32} \rightarrow \mathbb{R}^d$, where d is the dimension of the hypervector, e.g. d=512. The CNN may have the following structure: two convolutional layers, each with 128 filters of shape 5×5, a max-pooling layer with a 2×2 filter of stride 2, another two convolutional layers, each with 128 filters of shape 3×3, another max-pooling layer with a 2×2 filter of stride 2, and a fully connected layer with d units, where the last layer defines the dimensionality of the feature vectors. The output of the last dense layer is subjected to a sign or step activation (depending on the representation being bipolar or binary respectively) before feeding into the key memory 503.

The controller 501 may receive as input one support set of in images 510. The support set 510 may have a number m of classes (or support labels 506) and a number n of shots per class. The controller 501 may output one set of m×n hypervectors $K_1, \ldots K_{m \times n}$ respectively. The set of hypervectors $K_1, \ldots K_{m \times n}$ may be stored in the columns of the binary key memory 503 respectively. Each of the set of hypervectors $K_1, \ldots K_{m \times n}$ comprises d=512 components. After storing the set of hypervectors $K_1, \ldots K_{m \times n}$, the controller 501 may further receive a query image 511 and output a query hypervector. The similarity scores between the input query hypervector and the support hypervectors $K_1, \ldots K_{m \times n}$ is computed through in-memory dot products in the crossbar. This may result in an attention vector having m×n elements which are the m×n similarity scores. To further simplify the inference pipeline, the normalization of the attention vector and the regular absolute sharpening function may be bypassed. As indicated in FIG. 5A, prediction of a class comprises the accumulation of similarity scores belonging to the same support label 506 in the value memory 507 and finding the class with maximum accumulated response using a max comparator.

Hence, the inference phase may comprise both giving the model a few examples—that are mutually exclusive from the classes that were presented during the learning phase—to learn from, and inferring an answer with respect to those examples. During this phase, when a never-seen-before image is encountered, the controller quickly encodes and updates the key-value memory contents, that can be later retrieved for classification. This avoids relearning controller parameters through otherwise expensive and iterative training. For example, during testing (e.g. in the context of meta learning) the symbols used may belong to classes that were never exposed during training. For example, in case of a 10-way 5-shot problem, the training set may consist of images from Latin alphabet characters. One training episode may be provided by choosing 5 randomly chosen samples from 10 randomly chosen character classes into the support set and separately choosing another batch of query samples from the 10 character classes. The training may be performed over many episodes. At the end of the training, only the matured/trained controller and its learned weights values may be retained. That is, the key memory and value memory may be completely erased. At the start of testing, characters from a different alphabet, for example, Greek alphabet may be used. For example, 5 example images (thus few shot learning) from each of the 10 Greek characters that constitute the support set may be provided. Being able to fill up (not add to) the key memory with encodings of only a few support images is what is referred to as "quickly encodes" herein. Then when a query character image from that set is fed to the controller, it performs the inference.

FIG. 5B depicts a memory augmented neural network architecture in accordance with an example of the present subject matter.

FIG. 5B depicts a MANN architecture 520 with the bipolar key memory 523 enabling analog in-memory computations and a mature controller 521. This architecture is different from the one presented in FIG. 5A for the binary representations in the following ways: First, the activation function used at the output of the embedding function in the controller 521 is changed to a sign function, generating bipolar query and support vectors. Second, the crossbar utilizes twice the number of columns compared to the binary architecture to store the complementary versions of the support vectors on the crossbar. This effectively doubles the number of memristive devices. Third, a regular absolute (abs) function approximates the softabs sharpening function during inference. This is indicated in FIG. 5B where each weighted score of the m×n scores is processed with an abs function. Fourth, there are some changes to the peripheral circuits in the way the original support/query vector are fed from the controller: the complementary version of it is fed to the wordline drivers in a time multiplexed manner. Furthermore, the resulting current on the bitline from the original support vectors is saved in an array of capacitors and subtracted from the current measured on the corresponding complementary bitline before sending the net current to the ADC array. The odd columns represent the original support vectors, whereas the even columns indicate the complementary versions.

FIG. 6 depicts three plots indicating the classification accuracy results using different sharpening functions for a 20-way 5-shot problem. Intra-class and inter-class cosine similarity spread across 1000 testing episodes in 20-way 5-shot problem with the softmax sharpening function is shown in plot 601. Intra-class and inter-class cosine similarity spread across 1000 testing episodes in 20-way 5-shot problem with the softabs sharpening function is shown in plot 602. The episodes are sorted by the intra-class to inter-class cosine similarity ratio highest to lowest. In the case of the softmax sharpening function, the margin between 10th percentile of intra-class similarity and 90th percentile of inter-class similarity is reduced, and sometimes becomes even negative due to overlapping distributions. In contrast, the softabs function may lead to a relatively larger margin separation (1.75×, on average) without causing any overlap. The average margin for the softabs is 0.1371, compared with 0.0781 for the softmax. The classification accuracy is shown in the form of a box plot 603 from 1000 few-shot episodes, where each episode consists of a batch of 32 queries. The softabs sharpening function achieves better overall accuracy and less variations across episodes for all few-shot problems. The average accuracy is depicted in each case.

Figure 7:
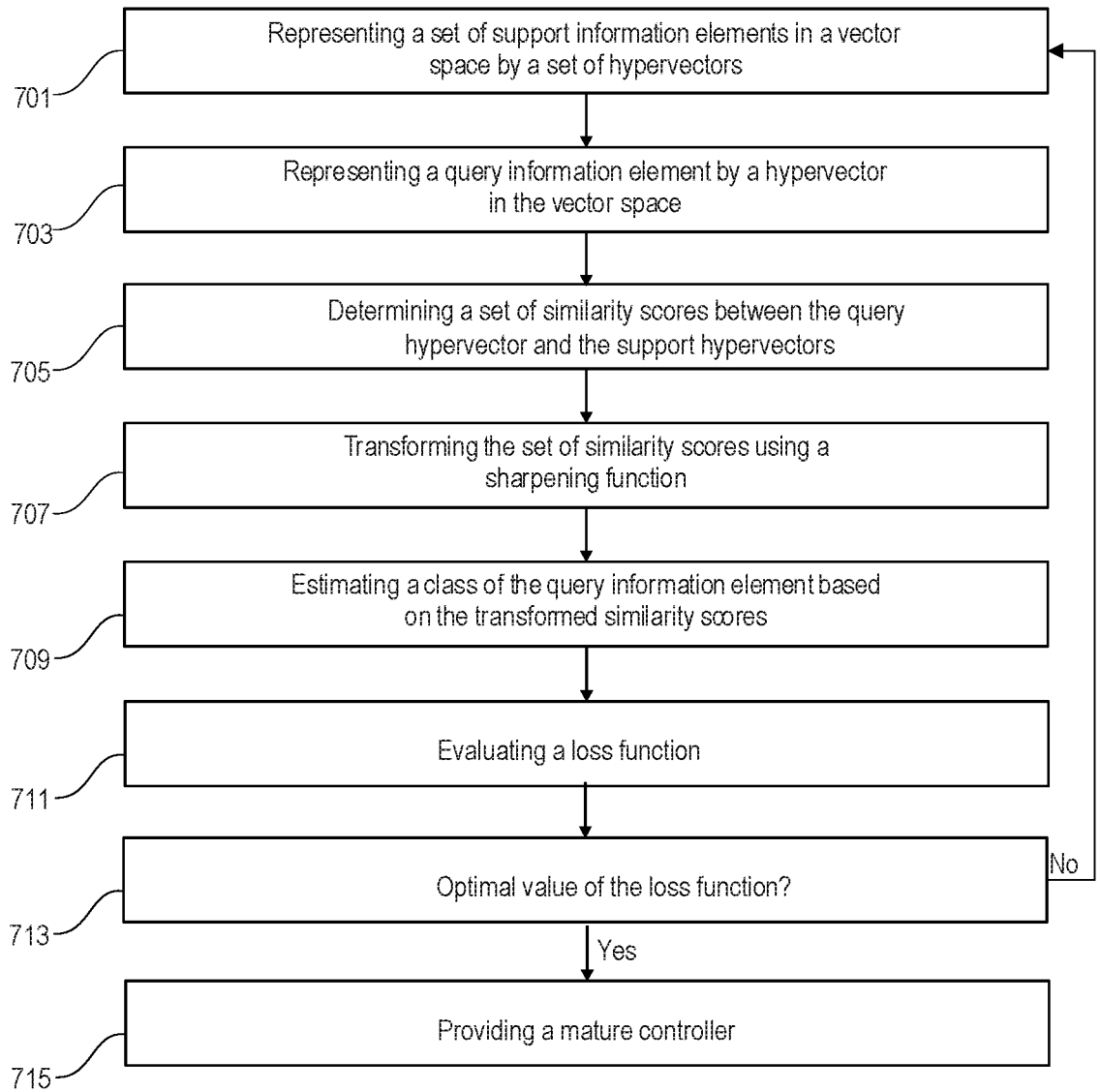
FIG. 7 is a flowchart of a method for training a classifier with a single query in accordance with an example of the present subject matter.

FIG. 7 is a flowchart of a method training a classifier in accordance with an example of the present subject matter. For the purpose of explanation, the method described in FIG. 7 may be implemented in the system illustrated in FIG. 1, but is not limited to this implementation.

The method of FIG. 7 comprises steps 701 to 709 which are steps 301 to 309 of FIG. 3 respectively. Step 701 may further comprise initializing the trainable parameters of the classifier for the first execution of step 701 or adapting the values of the trainable parameters in a further execution of step 701 based on a backpropagated error. After determining the class of the query information element in step 709, a loss function may be evaluated in step 711. The loss function may, for example, be provided as $\lambda_i = -\Sigma_{j=1}^{m}(Y_{i,j} \log(P_{i,j}) + (1-Y_{i,j})\log(1-P_{i,j}))$. It may be determined (inquiry step 713) whether an optimal value of the loss function is reached. In case the optimal value is reached, the classifier may be provided in step 715 as a mature controller. Otherwise, steps 701 to 715 may be repeated using another support set and another query information element, wherein in each iteration the parameters of the classifier are adapted e.g. in order to minimize the loss function.

Figure 8:
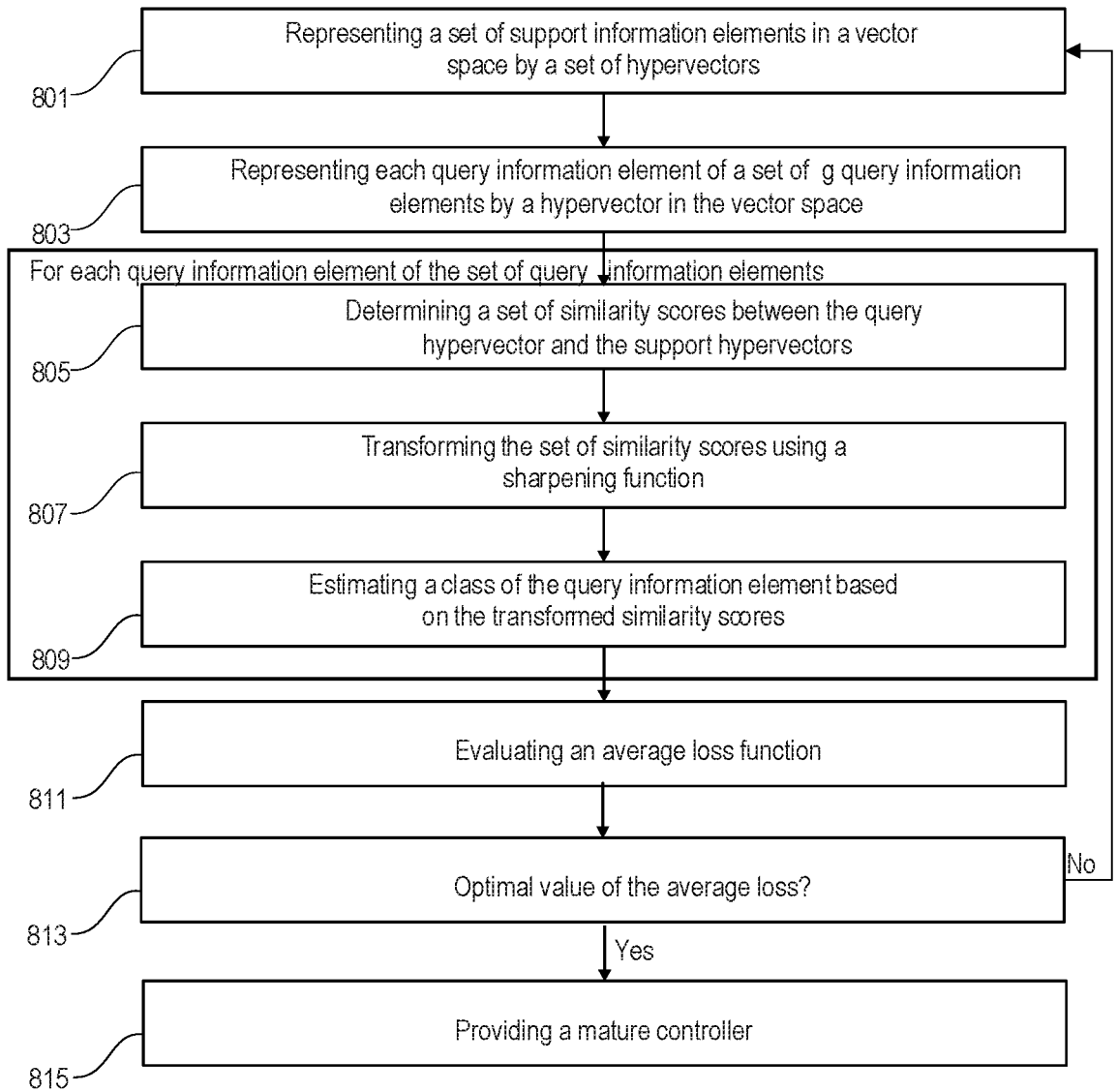
FIG. 8 is a flowchart of a method for training a classifier with a batch of queries in accordance with an example of the present subject matter.

FIG. 8 is a flowchart of a method for training a classifier in accordance with an example of the present subject matter. For the purpose of explanation, the method described in FIG. 7 may be implemented in the system illustrated in FIG. 1, but is not limited to this implementation.

Steps 801 to 815 of the method of FIG. 8 are similar to the corresponding steps 701 to 715 of the method of FIG. 7 with the difference that multiple query information elements (e.g. query information elements) are represented in the vector space in step 803 (compared to step 703), steps 805 to 809 are performed for each query information element of the multiple query information elements and an average loss function $$\text{loss} = \frac{1}{m}\sum\nolimits_{i=1}^{g}$$

$\lambda_i$ is computed in step 811.

Some embodiments of the present invention comprises the following clauses.

Clause 1. A method for classification, the method comprising: (i) representing a set of support information elements in a vector space by a set of hypervectors, wherein the vector space is provided such that hypervectors representing different classes of the information elements are dissimilar; (ii) representing at least one query information element by a respective hypervector in the vector space; (iii) determining a similarity score of the query information element with the set of support information elements using the hypervectors, resulting in a set of similarity scores associated with the set of support information elements respectively; (iv) transforming the set of similarity scores using a sharpening function such that the transformed scores are decreasing as negative similarity scores increase and the transformed scores are increasing as positive similarity scores increase; and (v) providing an estimation of a class of the query information element based on the transformed similarity scores.

Clause 2. The method of clause 1, wherein the representation is performed by a machine learning based classifier.

Clause 3. The method of clause 2, the method further comprising: (vi) comparing the estimated class of the query information element with a true class of the query information element; (vii) determining an estimation error based on the comparison result; and repeatedly performing steps (i) to (vii) for training the classifier, the training being performed with backpropagation for optimizing a predefined loss function.

Clause 4. The method of clause 2, wherein the machine learning based classifier is a trained classifier.

Clause 5. The method of any of the preceding clauses 2 to 3, wherein the machine learning based classifier is provided in accordance with a memory augmented neural network (MANN) architecture, wherein an explicit memory is configured to store the set of hypervectors of the set of support information elements.

Clause 6. The method of clause 5, the memory comprising a neuromorphic memory device with a crossbar array structure that includes input lines and output lines interconnected at junctions via electronic devices.

Clause 7. The method of clause 6, wherein the crossbar array structure comprises a single electronic device per junction, wherein the electronic device is a memristive device.

Clause 8. The method of any of the preceding clauses 1 to 7, further comprising providing the hypervectors as binary vectors or bipolar vectors.

Clause 9. The method of any of the preceding clauses 2 to 8, the classifier comprising a CNN.

Clause 10. The method of any of the preceding clauses 1 to 9, the information element being an image or a set of characters.

Clause 11. The method of any of the preceding clauses 1 to 10, the set of support information elements having a set of classes, wherein the query information element belongs to one of the set of classes.

Clause 12. The method of any of the preceding clauses 3 to 11, wherein the loss function further includes at least one of the regularizing terms:

$$\mathcal{L}_{oc} = -\frac{1}{mn}\sum\nolimits_{i=1}^{mn}\left(\frac{1}{d}\sum\nolimits_{j=1}^{d}\left(\tanh(aK_i(j)) + \frac{1}{2}\right) - 0.5\right)^2 \text{ and}$$

$$\mathcal{L}_{aux} = \frac{-1}{mnd}\sum\nolimits_{i=1}^{mn}\sum\nolimits_{j=1}^{d} \tanh(aK_i(j) + \delta) - \tanh(aK_i(j) - \delta),$$

where $K_i$ is a support hypervector of dimension d, m is the number of classes, and n is the number of support information elements per class.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium (sometimes referred to as machine readable storage media) can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method (CIM) for classification, the method comprising:
representing a set of support information elements in a vector space by a set of hypervectors, wherein the vector space is provided such that hypervectors representing different classes of the information elements are dissimilar;
representing at least one query information element by a respective hypervector in the vector space, wherein the respective hypervector representation of the at least one query information element is performed by a machine learning based classifier;
determining a similarity score of the query information element with the set of support information elements using the hypervectors, resulting in a set of similarity scores associated with the set of support information elements respectively;
transforming the set of similarity scores using a sharpening function such that the transformed scores are decreasing as negative similarity scores increase and the transformed scores are increasing as positive similarity scores increase;
providing an estimation of a class of the query information element based on the transformed similarity scores;
comparing the estimated class of the query information element with a true class of the query information element; and
determining an estimation error based on the comparison result;
wherein representing a set of support information elements in a vector space, representing at least one query information elements, determining a similarity score, transforming the set of similarity scores, providing an estimation, comparing the estimated class of the query information element, and determining an estimation error based on the comparison results are repeatedly executed to train the classifier with backpropagation for optimizing a predefined loss function, wherein the loss function further includes at least one of the regularizing terms:

$$\mathcal{L}_{sc} = \frac{-1}{mn} \sum_{i=1}^{mn} \left( \frac{1}{d} \sum_{j=1}^{d} \left( \tanh(aK_1(j)) + \frac{1}{2} \right) - 0.5 \right)^2$$

-continued and $$\mathcal{L}_{aux} = \frac{-1}{mnd} \sum_{i=1}^{mn} \sum_{j=1}^{d} \tanh(aK_i(j) + \delta) - \tanh(aK_i(j) - \delta),$$

where $K_i$ is a support hypervector of dimension d, m is the number of classes, and n is the number of support information elements per class.

2. The CIM of claim 1, wherein the machine learning based classifier is a trained classifier.

3. The CIM of claim 1, wherein the machine learning based classifier is provided in accordance with a memory augmented neural network (MANN) architecture, wherein an explicit memory is configured to store the set of hypervectors of the set of support information elements.

4. The CIM of claim 3, the memory comprising a neuromorphic memory device with a crossbar array structure that includes input lines and output lines interconnected at junctions via electronic devices.

5. The CIM of claim 4, wherein the crossbar array structure comprises a single electronic device per junction, wherein the electronic device is a memristive device.

6. The CIM of claim 1, further comprising providing the hypervectors as binary vectors or bipolar vectors.

7. The CIM of claim 1, the classifier comprising a convolutional neural network (CNN).

8. The CIM of claim 1, the information element being an image or a set of characters.

9. The CIM of claim 1, the set of support information elements having a set of classes, wherein the query information element belongs to one of the set of classes.

* * * * *